US012761172B2

(12) United States Patent
Frantz

(10) Patent No.: US 12,761,172 B2
(45) Date of Patent: Oct. 13, 2026

(54) ROD ISOLATION CHECK METHOD USING VOLTAGE DIVIDER

(71) Applicant: Dust Company, Inc., Raleigh, NC (US)

(72) Inventor: Frederick E. Frantz, Raleigh, NC (US)

(73) Assignee: Dust Company, Inc., Raleigh, NC (US)

( * ) Notice: Subject to any disclaimer, the term of this patent is extended or adjusted under 35 U.S.C. 154(b) by 176 days.

(21) Appl. No.: 18/907,723

(22) Filed: Oct. 7, 2024

(65) Prior Publication Data

US 2025/0116621 A1 Apr. 10, 2025

Related U.S. Application Data

(60) Provisional application No. 63/588,885, filed on Oct. 9, 2023.

(51) Int. Cl.
*G01N 27/04* (2006.01)

(52) U.S. Cl.
CPC .................................. *G01N 27/041* (2013.01)

(58) Field of Classification Search
CPC ......... G01N 27/041; G01N 2015/0046; G01N 15/0606; G01N 15/0656; G01N 27/028; G01R 27/02
USPC .......................................................... 324/693
See application file for complete search history.

(56) References Cited

U.S. PATENT DOCUMENTS 5,831,427 A * 11/1998 Janke ................. G01R 19/2509 324/115
9,482,706 B2 11/2016 Frantz
2020/0348159 A1* 11/2020 Ciesla .................... G01K 7/183
2021/0203346 A1* 7/2021 Goenka ................ H02M 3/156

FOREIGN PATENT DOCUMENTS

CN 107132417 B 5/2019
EP 2932281 B1 9/2021
JP H07239313 A 9/1995
JP 5796350 B2 8/2015

OTHER PUBLICATIONS

"International Preliminary report on Patentability, issued in PCT Application No. PCT/US2024/050161, dated: Apr. 7, 2026, 7 pages".
International Search Report and Written Opinion corresponding to PCT/US2024/050161, Jan. 8, 2025, 15 pp.

* cited by examiner

*Primary Examiner* — Roberto Velez
(74) *Attorney, Agent, or Firm* — Myers Bigel, P.A.

(57) ABSTRACT

A method of measuring impedance, includes: providing an input voltage (Vin) across an impedance determination circuit comprising a first resistance (R1) and a known second resistance (R2) connected in series, the first resistance being switchable between a known first resistance and a dust build up resistance between a dust sensor and a process wall; switching the first resistance to the dust build up resistance; measuring an output voltage (Vo) across the second resistance or the dust build up resistance; and determining the dust build up resistance based on Vin, Vo, and R2.

10 Claims, 9 Drawing Sheets

| Nominal Resistance (MOhms) | Measured Resistance (MOhms) |
|---|---|
| 10 | 10.8 |
| 20 | 21.5 |
| 40 | 43.1 |

FIG. 7

New vs Existing Method – Sensor Temperature

| Temperature (F) | Resistance Level (Mohms) | | |
|---|---|---|---|
| | 10 | 20 | 40 |
| New Method | | | |
| 83 | 11.0 | 21.5 | 47.3 |
| 93 | 11.0 | 21.5 | 42.5 |
| 103 | 11.0 | 21.5 | 42.5 |
| 113 | 11.0 | 21.5 | 42.5 |
| 122 | 11.0 | 21.5 | 42.5 |
| 133 | 11.0 | 21.5 | 38.5 |
| 143 | 11.7 | 20.0 | 35.0 |
| 153 | 11.7 | 20.0 | 32.0 |
| Existing Method | | | |
| 81 | 10.8 | 22.4 | 47.3 |
| 93 | 10.7 | 23.4 | 42.5 |
| 101 | 10.6 | 24.2 | 42.5 |
| 112 | 10.6 | 30.4 | 42.5 |
| 122 | 10.8 | TO | TO |
| 131 | 11.3 | TO | TO |
| 140 | IF | IF | IF |

TO=Timeout (RIC went through duration of test before timing out), IF=Immediate Failure (RIC initiates and stops after 1-2 seconds)

FIG. 8

New vs Existing Method – Variable Cable Lengths

| Cable Length | Resistance Level (Mohms) | | |
|---|---|---|---|
| | 10 | 20 | 40 |
| New Method | | | |
| 6 inches | 11 / 11 | 23.2 / 23.2 | 47.3 / 47.3 |
| 50 feet | 11 / 11 | 23.2 / 23.2 | 47.3 / 47.3 |
| 100 feet | 11 / 11 | 21.5 / 23.2 | 42.5 / 47.3 |
| 150 feet | 11 / 11 | 23.2 / 23.2 | 42.5 / 47.3 |
| Existing Method – 1 | | | |
| 6 inches | 10.8 / 10.9 | 23.6 / 23.4 | 55.8 / 53.6 |
| 50 feet | 9 / 9.1 | 19.3 / 19.4 | 44.2 / 44 |
| 100 feet | 2.1 / 2.4 | 2.9 / 3.2 | 5.3 / 5.4 |
| 150 feet | 1.6 / TO | 2 / TO | 2.9 / TO |
| Existing Method – 2 | | | |
| 6 inches | 10.8 / 10.8 | 22.6 / 22.7 | 48.7 / 49.5 |
| 50 feet | 9.3 / 9.3 | 19 / 19 | 41 / 40.9 |
| 100 feet | 2.8 / 2.7 | 4.6 / TO | 8.8 / TO |
| 150 feet | TO / TO | TO / TO | TO / TO |

TO – Timeout (test ran the duration before timing out)

FIG. 9

ROD ISOLATION CHECK METHOD USING VOLTAGE DIVIDER

CROSS-REFERENCE TO RELATED APPLICATION

The present application claims priority to U.S. Provisional Patent Application Ser. No. 63/588,885, filed Oct. 9, 2023, the entire content of which is incorporated by reference herein as if set forth in its entirety.

BACKGROUND

The present invention relates to electrical circuit element measurement technology, and, more particularly, to methods and circuits for measuring high impedance elements.

Charge based dust sensors are used worldwide in many different applications to detect the particulate in gas streams, including broken bag leak detectors, pm monitors, etc. These sensors work by monitoring the charge on particles in the gas stream as they transfer the DC charge from direct impact with the rod or induce an AC voltage as they pass near the rod. The rod is basically an antenna into the process to collect the dust signals. The dust signals are transferred through the rod to the processing electronics and then to signal ground. Isolation of the rod is performed to maintain quality dust readings and normal operation of the sensor. When build-up (dust, moisture, condensation, etc.) forms a bridge/short circuit between the rod and the process wall, the dust signal will by-pass the sensor's electronics.

One technique for detecting the contamination or build-up involves measuring the impedance of the contamination as it accumulates and forms a bridge between the sensor's rod and the process wall. However, this approach may not work properly in conditions with higher temperature or when a remote probe is used as part of the system.

High temperatures may result in a change of the properties of the components used for the contamination detection technique and may result in improper results and in some cases failure of the method for detecting the contamination. A remote probe is used in situations where the sensor's electronics needs to be located a safe distance from the process being monitored. Some situations that require a remote probe are high temperatures and high vibration. Due to the impedance on the coax cable used to transfer the dust signal from the remote probe to the sensor's electronics, the contamination detection technique may not work based on the components on the sensors.

Because it may be difficult to custom build sensors for different lengths of coax cable or adapt each circuit for ambient temperatures, a new method for contamination detection may be desired under these harsher applications.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments of the inventive concept provide a method of measuring impedance, comprising: providing an input voltage (Vin) across an impedance determination circuit comprising a first resistance (R1) and a known second resistance (R2) connected in series, the first resistance being switchable between a known first resistance and a dust build up resistance between a dust sensor and a process wall; switching the first resistance to the dust build up resistance; measuring an output voltage (Vo) across the second resistance or the dust build up resistance; and determining the dust build up resistance based on Vin, Vo, and R2.

In other embodiments, measuring Vo comprises measuring Vo across the second resistance; and determining the dust build up resistance comprises determining the dust build up resistance as R2*(Vin−Vo)/Vo.

In still other embodiments, measuring Vo comprises measuring Vo across the dust build up resistance; and determining the dust build up resistance comprises determining the dust build up resistance as Vo*R2/(Vin−Vo).

In still other embodiments, the known first resistance has a nominal resistance value, the method further comprising: switching the first resistance to the known first resistance; measuring an output voltage (Vo) across the second resistance or the known first resistance; and determining the known first resistance based on Vin, Vo, and R2 to generate an estimated resistance value for the known first resistance.

In still other embodiments, the method further comprises generating a scaling factor based on the nominal resistance value of the known first resistance and the estimated resistance value for the known first resistance; and modifying the determined dust build up resistance based on the scaling factor.

In still other embodiments, an ambient temperature surrounding the dust sensor and the process wall is in a range of about 112 degrees Fahrenheit to about 153 degrees Fahrenheit.

In still other embodiments, a cable length used for measuring the output voltage ranges from about 6 inches to about 150 feet.

Some embodiments of the inventive concept provide an impedance measurement circuit, comprising: a test circuit comprising a first resistance (R1) and a known second resistance (R2) connected in series; and a controller that is configured to switch the first resistance between a known first resistance and a dust build up resistance between a dust sensor and a process wall, to switch the first resistance to the dust build up resistance, to measure an output voltage (Vo) across the second resistance or the dust build up resistance; and to determine determining the dust build up resistance based on Vin, Vo, and R2.

In further embodiments, the known first resistance has a nominal resistance value; and the controller is further configured to switch the first resistance to the known first resistance, measure an output voltage (Vo) across the second resistance or the known first resistance, and determine the known first resistance based on Vin, Vo, and R2 to generate an estimated resistance value for the known first resistance.

In still further embodiments, the controller is further configured to generate a scaling factor based on the nominal resistance value of the known first resistance and the estimated resistance value for the known first resistance, and to modify the determined dust build up resistance based on the scaling factor.

Other methods, systems, computer program products, devices, and/or apparatus according to embodiments of the inventive concept will be or become apparent to one with skill in the art upon review of the following drawings and detailed description. It is intended that all such additional methods, systems, computer program products, and/or apparatus be included within this description, be within the scope of the present invention, and be protected by the accompanying claims. It is noted that aspects of the invention described with respect to one embodiment, may be incorporated in a different embodiment although not specifically described relative thereto. That is, all embodiments and/or features of any embodiment can be combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

FIGS. 7-9 are test results that compare impedance measurement of an unknown impedance according to some embodiments of the inventive concept and impedance measurement using RC circuit principles.

DETAILED DESCRIPTION

Figure 1:
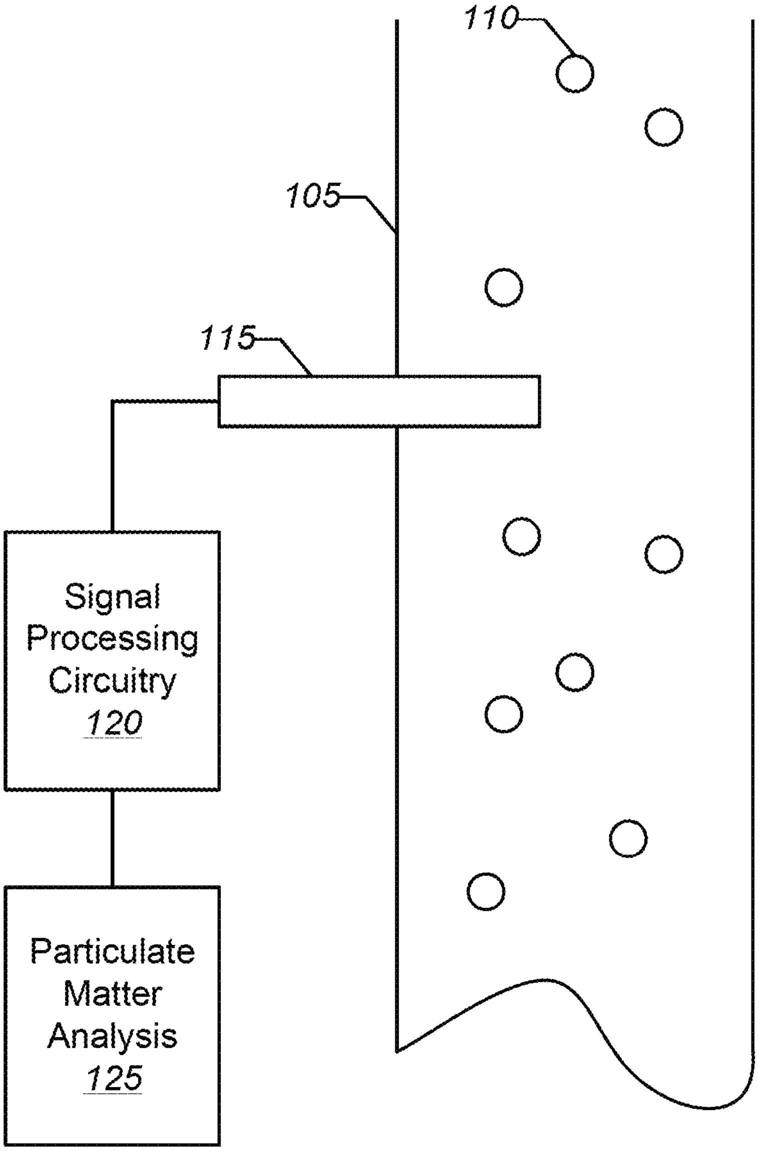
FIG. 1 (Prior Art)
FIG. 1 is a diagram that illustrates circuitry for evaluating the concentration of particulate in a gas stream t.

While embodiments of the invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Many electrical circuits require a high level of isolation for electrical components to ensure that these components aren't adversely affected by short circuits, electrical fields, magnetic fields, and the like. FIG. 1 illustrates an example where electrical isolation of measurement circuit components is important to obtain valid data. In particular, FIG. 1 is a diagram that illustrates circuitry for evaluating the concentration of particulate in a gas stream. A stack 105 has a gas that flows therethrough and contains particulate matter 110. A probe 115 is configured to extend into the gas stream and is charged through a triboelectric effect by the particulate matter 110 colliding with the probe 115. The triboelectric effect results in a signal being generated, which can be processed by signal processing circuitry 120 and provided as an input to a particulate matter analysis module 125 to evaluate the concentration of the particulate 110 matter in the gas stream.

The particulate matter 110 in the gas stream along with dust and other foreign debris can build up on surfaces of the stack 105 and/or the probe 115 and have the potential to affect the electrical characteristics of the probe 115. For example, build-up of debris adjacent to the probe 115 may create electrical paths to ground or other electrical circuits resulting in a signal output from probe 115 that is not representative of the concentration of the particulate matter 110 in the gas stream.

Figure 2:
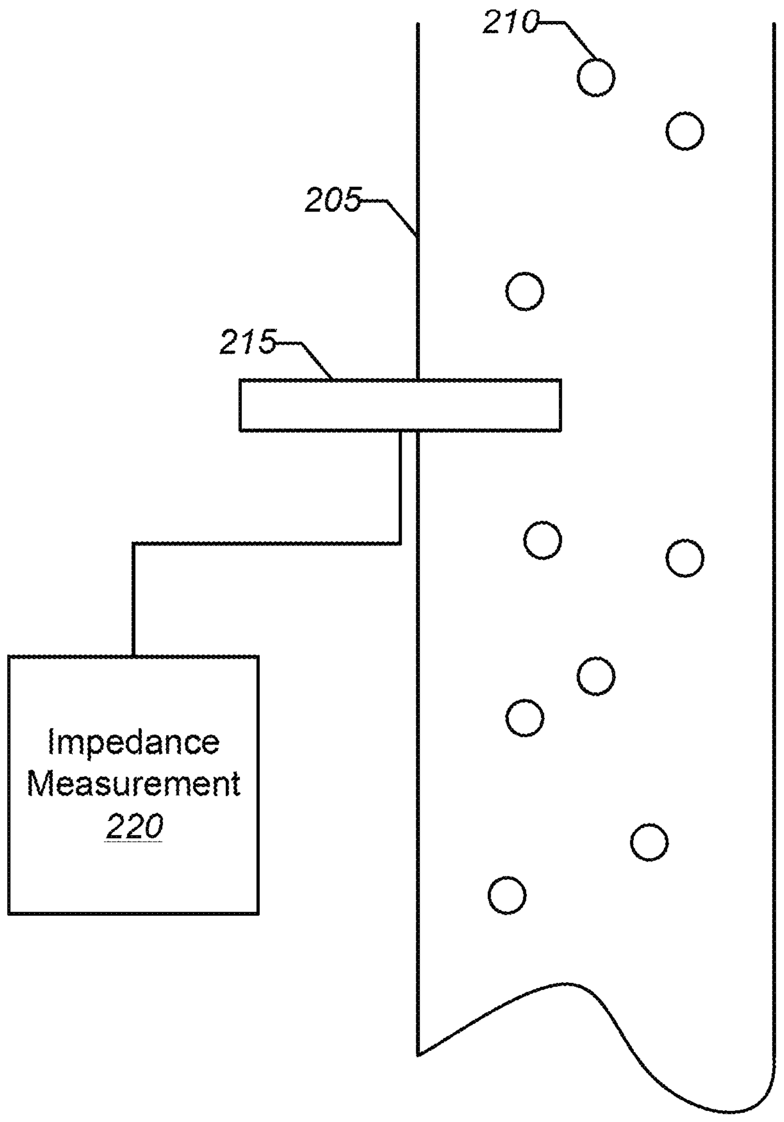
FIG. 2 illustrates an application for measuring a target impedance using an impedance measurement circuit according to some embodiments of the inventive concept.

FIG. 2 illustrates an application for measuring a target impedance using an impedance measurement circuit according to some embodiments of the inventive concept. In particular, FIG. 2 is similar to FIG. 1 and illustrates circuitry for evaluating the concentration of particulate in a gas stream. A stack 205 has a gas that flows therethrough and contains particulate matter 210. A probe 215 is configured to extend into the gas stream and is charged through a triboelectric effect by the particulate matter 210 colliding with the probe 215. The triboelectric effect results in a signal being generated, which can be processed to evaluate the concentration of the particulate 210 matter in the gas stream as described above. Further, as described above, build-up of debris adjacent to the probe 215 may create electrical paths to ground or other electrical circuits resulting in a signal output from probe 215 that is not representative of the concentration of the particulate matter 210 in the gas stream. The impedance measurement circuit 220, according to some embodiments of the present invention, may be connected to the probe 215 to measure a target impedance between the probe 215 and ground or another reference node based on impedance or resistance determinations.

Figure 3:
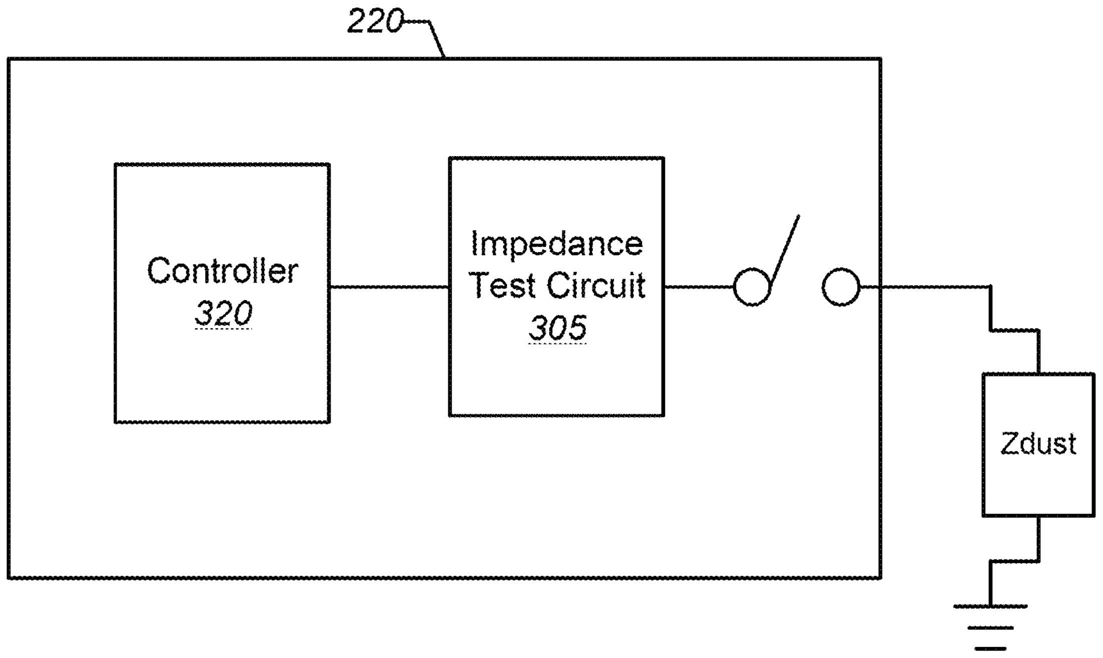
FIG. 3 is a block diagram of the impedance measurement circuit FIG. 2 according to some embodiments of the inventive concept.

FIG. 3 is a block diagram of the impedance measurement circuit 220 of FIG. 2 according to some embodiments of the present invention. The impedance measurement circuit 220 comprises an impedance test circuit 305 and a controller 320, which are connected as shown. A target impedance to be measured, which is identified as Zdust, can be switched into the impedance test circuit 305 for determining a voltage division based on the target impedance. The controller 320 is configured to coordinate the operations of the other components of the impedance measurement circuit 220 including switches and to process the data from the known circuit element values and measured voltages from the impedance test circuit 305 to determine the value of the target impedance Zdust. The impedance Zdust may correspond to the impedance or resistance that results from dust build up between a dust sensor, such as the probe 215 and another element, such as a process wall of the stack 205.

Figure 4:
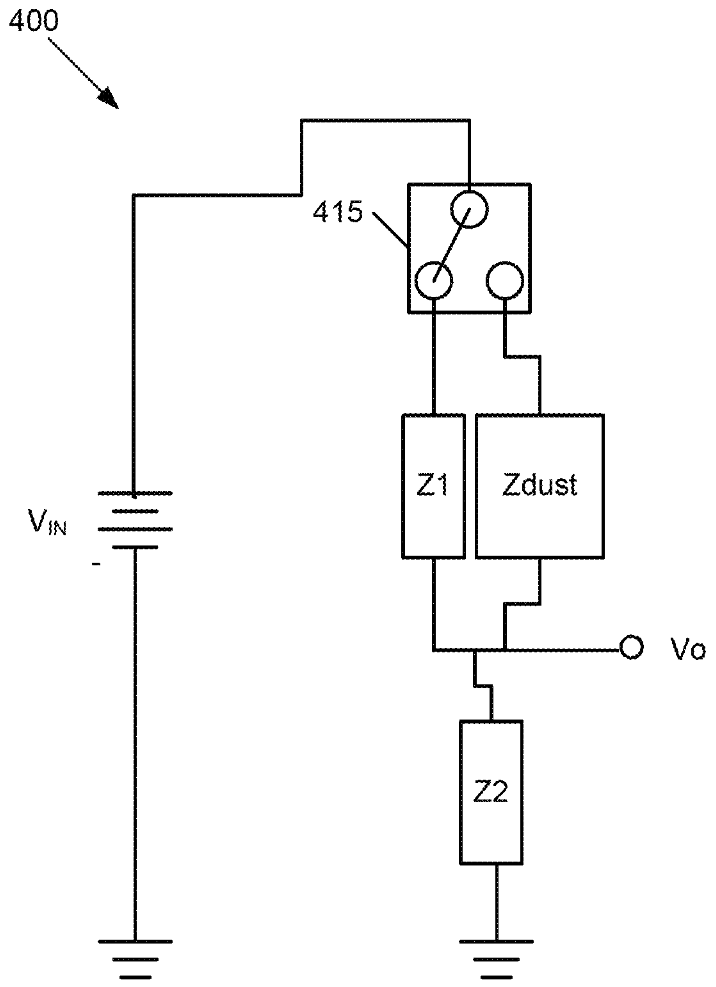
FIG. 4 is a schematic of the impedance test circuit of FIG. 3 according to some embodiments of the inventive concept.

FIG. 4 is a schematic of the impedance test circuit 305 of FIG. 3 according to some embodiments of the present inventive concept. The impedance test circuit schematic 400 includes an input voltage Vin that is provided across an impedance determination circuit comprising a first impedance or resistance Z1/Zdust and a known second impedance or resistance Z2. As shown in FIG. 4, the first impedance or resistance is switchable via switch 415 between a known first impedance or resistance Z1 and a dust build up impedance or resistance Zdust, which results from dust build up between a dust sensor and another element, such as a process wall of the stack 205. The process wall may be any structure which may form an electrical connection with a dust sensor due to dust build up. The controller 320 may be configured to measure an output voltage Vo across the known second impedance or resistance Z2 (as shown in FIG. 4) or across the first impedance or resistance Z1/Zdust, which is switchable between the known first resistance or impedance Z1, and the dust build up impedance or resistance Zdust.

Figure 5:
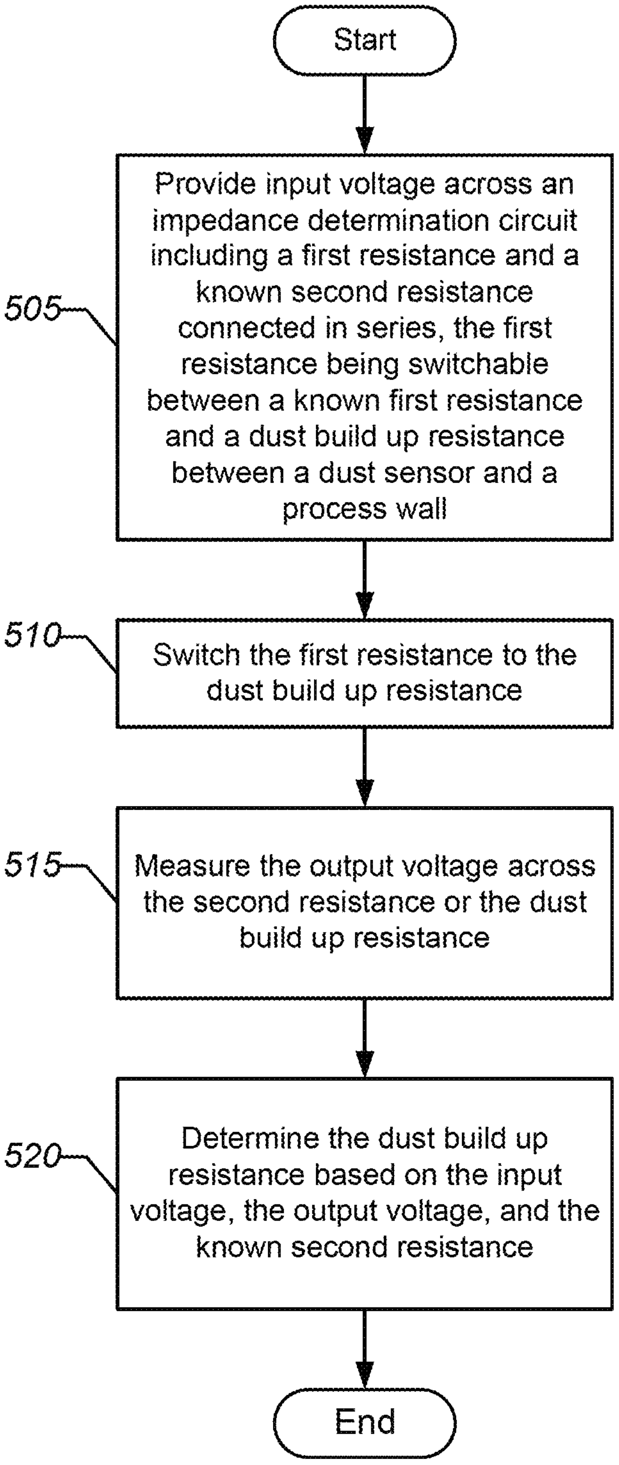
FIGS. 5 and 6 are flowcharts illustrate operations for measuring impedance according to some embodiments of the inventive concept
Figure 6:
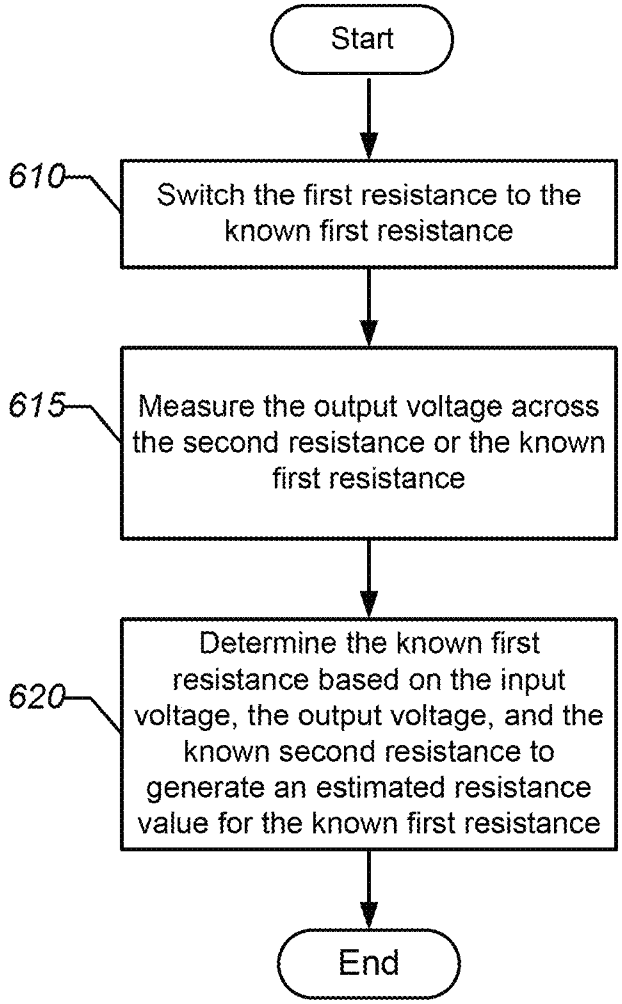

FIGS. 5 and 6 are flowcharts that illustrate operations for measuring impedance, such as dust buildup impedance or resistance between a dust sensor and another structure, such as a process wall, according to some embodiments of the inventive concept. Referring to FIG. 5, operations begin at block 505 where an input voltage Vin is provided across an impedance determination circuit including a first resistance and a known second resistance (Z2 or R2) connected in series, the first resistance being switchable between a known first resistance (Z1 or R1) and a dust build up resistance (Zdust) between a dust sensor and a process wall. The controller 320 operates the switch 415 to switch the first resistance to the dust build up resistance Zdust at block 510. The controller 320 may then measure the output voltage across the second resistance Z2 or R2 or the dust build up resistance Zdust at block 515. The dust build up resistance value may be determined at block 520 based on the values for the input voltage, the measured output voltage, and the known second resistance.

When the output voltage is measured across the known second resistance, then the dust build up resistance is given by R2*(Vin−Vo)/Vo where Vin is the input voltage and Vo is the measured output voltage.

When the output voltage is measured across the dust build up resistance, then the dust build up resistance is given by Vo*R2/(Vin−Vo).

Referring now to FIG. 6, to enhance the accuracy of the determination of the dust build up resistance Zdust, the controller 320 may switch a known first resistance element Z1 or R1 into the circuit in place of the dust build up resistance Zdust using the switch 415 at block 610. Similar to the operations of FIG. 5, the output voltage may be measured across the known second resistance Z2 or R2 or the known first resistance Z1 or R1 at block 615. An estimated resistance value may be determined for the known first resistance Z1 or R1 at block 620 based on the values for the input voltage, the measured output voltage, and the known second resistance.

Because the nominal resistance value of the known first resistance Z1 or R1 is known, a scaling factor may be generated based on this nominal resistance value and the estimated resistance value for the known first resistance Z1 or R1 determined at block 620. For example, if the estimated resistance value for the known resistance Z1 or R1 is 5% higher than the nominal resistance, then the dust build up resistance determinations may be modified accordingly. In this example, the dust build up resistance determinations may be reduced by 5% to account for the impedance test circuit determining slightly high levels of impedance for a known impedance, such as the dust build up resistance.

Thus, some embodiments of the inventive concept may provide a method and circuit for determining the impedance of any build-up or bridge between a dust sensor rod and a process wall for example.

Although illustrated with respect to determining the resistance between a dust sensor and a process wall or other structure, for example, the unknown impedance or resistance Z1 or R1 may be a temperature-dependent or light-dependent resistor, for example.

The methodology of FIGS. 5 and 6 has been tested at various temperatures and using various coax cable lengths between the controller and the output voltage Vo measurement access point. A test box has been configured to simulate probe build-up by allowing one or more 10 megaohm resistors into a voltage divider circuit and then using measurements of Vin, Vo, and a known value of R2 to estimate the resistance. The nominal resistance levels and multi-metered resistance levels are shown in FIG. 7. The resistance value for each of these three resistors was then measured using an RC time constant methodology described in U.S. Pat. No. 9,482,706 ("Existing Method"), the disclosure of which is hereby incorporated herein by reference, and using the methodology embodiments described above with respect to FIGS. 5 and 6 ("New Method").

Temperature Testing

One sensor board using the Existing Method and one sensor board using the New Method were tested at different circuit temperatures and three different resistance levels. FIG. 8 is a table that shows how temperature affected the results of the Existing Method and the consistency of the New Method.

The Existing Method drift appears to provide good results for the 10 megaohm resistance level until the method fails at 140 F. As the resistance level increases, the tests start to fail at lower temperatures. The timeouts and failures are a result of the higher temperatures changing the circuitry components' values.

The New Method shows a slight temperature drift, which could be corrected post test, but still provides usable information up to 153 F, the highest temperature tested. Thus, the New Method according to some embodiments of the inventive concept is more reliable over a wider temperature range.

Cable Length Testing

Two sensor boards using the Existing Method and one sensor board using the New Method were used to perform two tests at each cable length and the three different resistance levels. FIG. 10 is a table that shows how cable length can affect the results of the Existing Method and the improved consistency of the New Method. As shown in FIG. 9, the increase in coax cable length increases the overall capacitance in the measurement path and affects the results of the Existing Method.

Some embodiments of the inventive concept may provide a system, device, and methodology for evaluating the extent of dust build-up or bridge on a sensor between, for example, a rod and a process wall, that can be used both under elevated temperature conditions as well as dust sensor configurations using a remote probe (longer coax cable) by estimating the impedance of the dust build-up. The ability to properly measure the existence of any build-up between the rod and the process may result in a higher quality of dust readings from all sensor applications. It may also reduce or eliminate unnecessary maintenance inspection of the systems. Reducing or eliminating unnecessary maintenance inspections, depending on where the units are installed, can also reduce safety issues for personnel. When the dust build up impedance satisfies a defined threshold, an alert may be generated that the system needs attention, or a self-cleaning operation may be initiated to clean the dust build up that has the potential to cause shorts or other electrical performance problems in the dust or particular matter measurement system.

Moreover, the methodology to check for the rod's or dust sensor's level of isolation from the process, according to some embodiments of the inventive concept, may be more representative and dependable than existing approaches. For applications with high temperatures, it allows the sensor's electronics to be mounted remotely from the extreme conditions and still provide the user with valuable dust readings along with a rod isolation check.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure of embodiments has been presented for purposes of illustration and description, but is not intended to be exhaustive or limited to the disclosure in the form disclosed. Many variations and modifications can be made to the embodiments without substantially departing from the principles of the present invention. All such variations and modifications are intended to be included herein within the scope of the present invention.

What is claimed is:

1. A method of measuring impedance, comprising:

providing an input voltage (Vin) across an impedance determination circuit comprising a first resistance (R1) and a known second resistance (R2) connected in series, the first resistance being switchable between a known first resistance and a dust build up resistance between a dust sensor and a process wall;

switching the first resistance to the dust build up resistance;

measuring an output voltage (Vo) across the second resistance or the dust build up resistance; and determining the dust build up resistance based on Vin, Vo, and R2.

2. The method of claim 1, wherein measuring Vo comprises measuring Vo across the second resistance; and wherein determining the dust build up resistance comprises determining the dust build up resistance as R2*(Vin−Vo)/Vo.

3. The method of claim 1, wherein measuring Vo comprises measuring Vo across the dust build up resistance; and wherein determining the dust build up resistance comprises determining the dust build up resistance as Vo*R2/(Vin−Vo).

4. The method of claim 1, wherein the known first resistance has a nominal resistance value, the method further comprising:

switching the first resistance to the known first resistance;

measuring an output voltage (Vo) across the second resistance or the known first resistance; and determining the known first resistance based on Vin, Vo, and R2 to generate an estimated resistance value for the known first resistance.

5. The method of claim 4, further comprising:

generating a scaling factor based on the nominal resistance value of the known first resistance and the estimated resistance value for the known first resistance; and modifying the determined dust build up resistance based on the scaling factor.

6. The method of claim 1, wherein an ambient temperature surrounding the dust sensor and the process wall is in a range of about 112 degrees Fahrenheit to about 153 degrees Fahrenheit.

7. The method of claim 1, wherein a cable length used for measuring the output voltage ranges from about 6 inches to about 150 feet.

8. An impedance measurement circuit, comprising:

a test circuit comprising a first resistance (R1) and a known second resistance (R2) connected in series; and a controller that is configured to switch the first resistance between a known first resistance and a dust build up resistance between a dust sensor and a process wall, to switch the first resistance to the dust build up resistance, to measure an output voltage (Vo) across the second resistance or the dust build up resistance; and to determine determining the dust build up resistance based on Vin, Vo, and R2.

9. The impedance measurement circuit of claim 8, wherein the known first resistance has a nominal resistance value; and wherein the controller is further configured to switch the first resistance to the known first resistance, measure an output voltage (Vo) across the second resistance or the known first resistance, and determine the known first resistance based on Vin, Vo, and R2 to generate an estimated resistance value for the known first resistance.

10. The impedance measurement circuit of claim 9, wherein the controller is further configured to generate a scaling factor based on the nominal resistance value of the known first resistance and the estimated resistance value for the known first resistance, and to modify the determined dust build up resistance based on the scaling factor.

* * * * *